Feb. 20, 1923.
A. MEISSNER.
1,445,636.
METHOD OF AND MEANS FOR INDICATING THE FREQUENCY ALTERATIONS OF AN ALTERNATING CURRENT
FILED MAY 3, 1922.
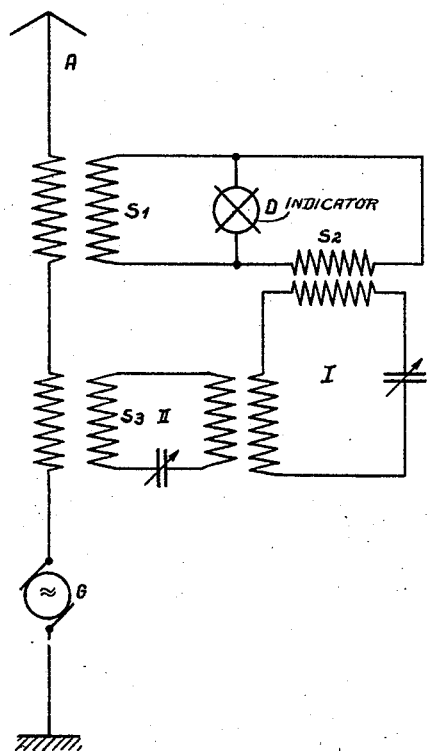

Patented Feb. 20, 1923.

1,445,636

UNITED STATES PATENT OFFICE.

ALEXANDER MEISSNER, OF BERLIN, GERMANY.

METHOD OF AND MEANS FOR INDICATING THE FREQUENCY ALTERATIONS OF AN ALTERNATING CURRENT.

Application filed May 3, 1922. Serial No. 558,303.

*To all whom it may concern:*

Be it known that I, ALEXANDER MEISSNER, a citizen of the Republic of Germany, and a resident of Hallesches Ufer, 12/13, Berlin, S. W. 11, Germany, have invented new and useful Improvements in Methods of and Means for Indicating the Frequency Alterations of an Alternating Current, for which application for Letters Patent No. G 53610 was filed in Germany, April 8, 1921, and of which the following is a specification.

In the use of radio energy, as, for example, in the transmission of messages by high frequency waves, it is often of great importance that the frequency of the waves shall be as nearly uniform as possible. The present invention relates to a method and circuit arrangement whereby variations in the frequency of the waves may be accurately and conveniently determined.

According to the invention an indicator of alternating currents is supplied with current by the system to be observed through two paths, the current of the one path being caused to differ in phase by 180° from the current of the other path by inserting circuits tuned to the desired frequency of the generator or other source of energy in the system. The indicator which may be a detector, an alternating current ammeter, a wattmeter, a tube indicator or such then registers at zero. If the frequency of the source of energy in the system changes, the circuits of the one path are no longer tuned to the energy being supplied to the system. The phase displacement is then no longer 180°, so that compensation does not take place, and the indicator shows current.

The drawing shows an example of this arrangement. A is an antenna excited by a high frequency generator G. The indicator D is supplied with energy from the antenna, on the one hand, by means of a coil $S_1$ and, on the other hand, by means of a coil $S_2$, included in a circuit I the circuit I being connected to the antenna by means of a circuit II having a coil $S_3$. As the current of the circuit II which is tuned to the antenna frequency or the generator frequency is 90° different in phase from the antenna current and, as the current of the circuit I is 90° different in phase from the current of the circuit II, the indicator D receives from the circuits I—II a current which is exactly 180° different in phase from the current which it receives through the coil $S_1$. If the coils $S_1$ and $S_2$ are suitably connected, and the coils $S_1$ and $S_3$ suitably coupled to the antenna A, the effects on the indicator D are neutralized as soon as the frequency of the generator G is exactly equal to that to which the circuits I and II are tuned so that the indicator points to zero, but if a frequency variation occurs, the indicator does not point to zero because no compensation then remains.

Having described my invention, what I claim is:

1. A method of indicating variations in the frequency of the current in an alternating current system which consists in transmitting alternating current from the system to an indicator coupled with the system along one path and also transmitting current from the system to the indicator along a second path at 180° difference in phase from the current along the first-mentioned path.

2. A method of indicating variations in the frequency of the current in an alternating current system including a generator which consists in transmitting alternating current from the system directly to a circuit, electrically connected to an indicator, along one path and also transmitting current from the system to the circuit along a second path, when the generator has the desired frequency, at 180° difference in phase from the current along the first-mentioned path and in an amount equal to the first-mentioned current so that said currents compensate each other and do not affect the indicator.

3. A circuit arrangement for indicating variations in the frequency of the current in an alternating current system, comprising a circuit having an indicator, coupling connections for transmitting current from the system to said circuit, other circuits tuned to the desired frequency of the source of energy of the system, and coupling connections between the system, the last-mentioned circuits and the first-mentioned circuit for transmitting current to the first-mentioned circuit at 180° difference in phase from the current transmitted to said circuit by said first-mentioned connections.

4. An alternating current system including a generator and a circuit arrangement for indicating variations in the frequency of the generator, comprising an indicator, a circuit electrically connected with the indicator, coupling means for transmitting current from the system to said circuit, and means separate from the first-mentioned means for transmitting current to said circuit at 180° difference in phase from the first-mentioned current, said last-mentioned means comprising coupling connections with the system and said circuit.

5. A circuit arrangement for indicating variations in the frequency of the current in an alternating current system, comprising a circuit having an indicator, means for transmitting current from the system to said circuit and means separate from the first-mentioned means for transmitting current to said circuit at 180° difference in phase from the first-mentioned current, said last-named means including a second circuit tuned to the desired frequency of the system.

6. An alternating current system including a generator and a circuit arrangement for indicating variations in the frequency of the generator comprising an indicator, a circuit electrically connected with the indicator, coupling means for transmitting current from the system to said circuit, and coupling means separate from the first-mentioned means for transmitting current to said circuit at 180° difference in phase from the first-mentioned current, said last-mentioned means including a second circuit tuned to the desired frequency of the generator.

7. An alternating current system including a generator and a circuit arrangement for indicating variations in the frequency of the generator, comprising a circuit having a coil, coupled to the system, a second coil and an indicator arranged in shunt with said first-mentioned coil, and means cooperating with said second coil to transmit current from the system to said circuit at 180° difference in phase from the current transmitted to the system by the first-mentioned coil.

8. A circuit arrangement for indicating variations in the frequency of the current in an alternating current system including an antenna and an alternating current generator connected with the antenna, said arrangement comprising a circuit coupled with the antenna, an indicator in said circuit, a second circuit also coupled with the antenna and having the current therein differing in phase by 90° from the current in the antenna and a third circuit having the current therein differing in phase by 90° from the current in said second circuit, said second and third circuits being tuned to the desired frequency of the generator and said third circuit being coupled to the first-mentioned circuit so as to transmit current thereto at a difference in phase of 180° from the current transmitted to said circuit by said first-mentioned coupling, so as to cause the currents in the indicating circuit to compensate each other when the generator is supplying energy of the desired frequency.

In testimony whereof I affix my signature in the presence of two witnesses.

ALEXANDER MEISSNER.

Witnesses:
 Max Abrahamsohn,
 Ernst Wilke.